(12) United States Patent
Zhang et al.

(10) Patent No.: US 11,664,901 B2
(45) Date of Patent: May 30, 2023

(54) SYSTEM, APPARATUS AND METHOD FOR EFFICIENT OPTICAL SIGNAL AMPLIFICATION WITH SYSTEM MONITORING FEATURES

(71) Applicant: SubCom, LLC, Eatontown, NJ (US)

(72) Inventors: Sheng Zhang, Morganville, NJ (US); Haifeng Li, Morganville, NJ (US)

(73) Assignee: SUBCOM, LLC, Eatontown, NJ (US)

( * ) Notice: Subject to any disclaimer, the term of this patent is extended or adjusted under 35 U.S.C. 154(b) by 0 days.

(21) Appl. No.: 17/541,599

(22) Filed: Dec. 3, 2021

(65) Prior Publication Data

US 2022/0094437 A1    Mar. 24, 2022

Related U.S. Application Data

(62) Division of application No. 16/250,411, filed on Jan. 17, 2019, now Pat. No. 11,228,372.

(51) Int. Cl.
| | |
|---|---|
| *H04B 10/00* | (2013.01) |
| *H04B 10/291* | (2013.01) |
| *H04J 14/02* | (2006.01) |
| *H04B 10/294* | (2013.01) |
| *H04J 14/00* | (2006.01) |

(52) U.S. Cl.
CPC ....... *H04B 10/2912* (2013.01); *H04B 10/294* (2013.01); *H04J 14/0221* (2013.01)

(58) Field of Classification Search
CPC ............ G02B 6/29353; G02B 6/29361; G02B 6/2937
See application file for complete search history.

(56) References Cited

U.S. PATENT DOCUMENTS

| | | | |
|---|---|---|---|
| 7,388,657 B2 | 6/2008 | Abbott | |
| 8,009,983 B2 | 8/2011 | Zhang | |
| 8,873,909 B1 * | 10/2014 | Wang | .................. G02B 6/2937 385/33 |
| 9,182,550 B1 * | 11/2015 | Liu | ...................... G02B 6/2938 |
| 9,806,840 B2 | 10/2017 | Wang et al. | |
| 9,825,726 B2 | 11/2017 | Bolshtyansky et al. | |
| 9,967,051 B2 | 5/2018 | Zhang et al. | |
| 2014/0105595 A1 | 4/2014 | Grasso et al. | |
| 2018/0052076 A1 * | 2/2018 | Xia | ...................... G02B 6/2817 |
| 2019/0260468 A1 | 8/2019 | Xu et al. | |

* cited by examiner

*Primary Examiner* — Daniel G Dobson
(74) *Attorney, Agent, or Firm* — KDB Firm PLLC

(57) ABSTRACT

A system and method for efficient optical signal amplification with system monitoring features are provided. For example, an optical repeater may include two different 4-port thin-film gain flattening filters (TF-GFFs), which may be connected to provide a high-loss loop-back (HLLB) path in the optical repeater for system monitoring. The 4-port TF-GFF may have four different ports and may integrate the functionalities of a conventional GFF and a coupler into a single component, thereby increasing power efficiency of the optical repeater.

20 Claims, 9 Drawing Sheets

100

200

SYSTEM, APPARATUS AND METHOD FOR EFFICIENT OPTICAL SIGNAL AMPLIFICATION WITH SYSTEM MONITORING FEATURES

CROSS-REFERENCE TO RELATED APPLICATION

This application claims priority to and is a divisional application of U.S. Non-Provisional patent application Ser. No. 16/250,411, filed on Jan. 17, 2019, entitled "SYSTEM, APPARATUS AND METHOD FOR EFFICIENT OPTICAL SIGNAL AMPLIFICATION WITH SYSTEM MONITORING FEATURES," the contents of which are incorporated herein by reference in their entirety.

BACKGROUND

Technical Field

Embodiments of the present disclosure relate to the field of optical communication systems. More particularly, the present disclosure relates to a system, apparatus and method for efficient optical signal amplification with system monitoring features.

Long-haul optical communication systems, such as submarine optical communication systems, generally suffer from signal attenuation resulting from a variety of factors, including scattering, absorption, and bending. To compensate for attenuation, these long-haul systems may include a series of optical amplifiers or "repeaters" that are spaced along the transmission path between a transmitter and a receiver. The repeaters amplify the optical signal in a manner that allows reliable detection at the receiver. Typically, multiple repeaters are positioned along the transmission path depending on the length of the optical communication system.

It may be important to monitor the working condition of a long-haul optical communication system, such as detecting faults or breaks in the transmission cable, detecting faulty optical repeaters, or detecting other problems with the system. Known monitoring techniques include the use of various types of line monitoring equipment (LME) that may generate a test signal representing a pseudo random bit sequence, which may then be transmitted into the optical cable. The test signal is returned to the line monitoring equipment through a high-loss loop-back (HLLB) passive coupling at various locations along the optical cable. The LME monitors the returned test signal and processes the test signal to obtain data representing the HLLB loop gain or changes in the gain imparted to the test signal from each of the coupling locations along the optical cable including within the optical repeaters. HLLB monitoring may use loop gains or changes therein to characterize the optical path or to detect changes in the optical paths which may indicate a system fault.

With increasing capacity demand in these long-haul optical communication systems, the spatial and frequency densities of individual fiber optic transmission cables have been substantially increasing. This in-turn also increases the power levels and overall power consumption of these systems. Delivering high power levels can present a significant technical and economic challenge, for example, in submarine optical communication systems where the electrical power for the wet plant portion of the system must be transported along the cable. As a result, power efficiency may be an important consideration in overall system design.

One known technique for reducing power consumption in the wet plant equipment is increasing the power conversion efficiency of the active components within the optical repeaters, such as pump lasers, Erbium-doped fibers (EDFs), and the like. Apart from the active components, however, the excess power loss of various passive components in the optical repeaters may also largely limit overall power efficiency. For example, in an EDFA, the passive components may include a gain flattening filter (GFF), a band pass filter, an isolator, and a coupler, all of which may be essential in providing controllable repeater gain. One known example of an EDFA repeater design that integrates HLLB features includes a fiber Bragg grating (FBG) GFF (hereinafter referred to as "FBG-GFF"), two isolators, and a coupler at the output stage of the EDFA repeater. In addition to FBG-GFFs, another type of GFF that may be used in EDFAs is a thin-film GFF (hereinafter referred to as "TF-GFF"). Typically, a TF-GFF may be composed of a pair of fiber collimators (which uses a micro-lens to transform the light output from an optical fiber into a free-space collimated beam and vice versa) and a filter element, such as a substrate glass plate coated with multi-layered dielectric thin films to realize a specific filter spectral shape between the collimators. A conventional TF-GFF is a two-port device with input and output fibers. The collimated light beam from the input fiber is transmitted through the filter element and then coupled into the output fiber by the second collimator.

Reducing partial or total power loss from one or more of the above-described passive components (e.g., GFFs, FBG-GFFs, TF-GFFs, band pass filters, isolators, couplers, etc.) in an optical repeater (e.g., EDFA repeater) may produce a direct increase in power conversion efficiency within long-haul optical communication systems.

SUMMARY

Embodiments of the present disclosure are directed to a system and method for efficient optical signal amplification with system monitoring features. In one embodiment, a system may include an optical repeater for a fiber pair and one or more monitoring connections. The optical repeater may include a first 4-port thin-film gain flattening filters (TF-GFF) coupled to a first fiber and a second 4-port TF-GFF coupled to a second fiber, each 4-port TF-GFF having a first and second transmission port and a first and second reflection port. The optical repeater may also include an optical time-domain reflectometer (OTDR) filter that is connected to the first and second TF-GFFs. Moreover, the monitoring connections may include a first node and/or a second node, where the first node and/or the second node is configured to receive a line monitoring equipment (LME) channel signal for propagating the LME channel signal in the optical repeater for system monitoring.

In another embodiment, a method may include amplifying, via an optical repeater, a first signal input to a first fiber, and amplifying, via the optical repeater, a second signal input to a second fiber. The method also includes receiving one or more line monitoring equipment (LME) channel signals from an LME and propagating the one or more LME channel signals in the optical repeater. The method further includes providing the propagated one or more LME channel signals to the LME for monitoring the optical repeater. The optical repeater may include a first 4-port thin-film gain flattening filters (TF-GFF) coupled to a first fiber and a second 4-port TF-GFF coupled to a second fiber, where at least the first and second 4-port TF-GFFs are connected to form a high-loss loop-back (HLLB) path.

DETAILED DESCRIPTION

Figure 1:
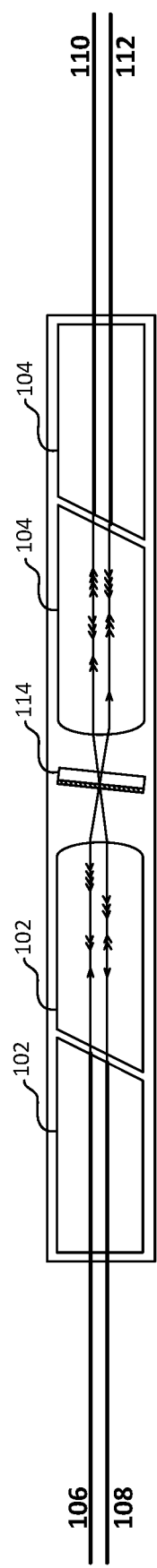
FIG. 1 illustrates an example 4-port thin-film gain flattening filter (TF-GFF) in accordance with one or more embodiments of the disclosure.

The present invention is directed to a system, apparatus and method for amplifying optical signals using an optical repeater with high power conversion efficiency. For example, the optical repeater may include a new and novel type of TF-GFF, a 4-port TF-GFF, which integrates the functionality of a conventional gain flattening filter and an optical coupler. This design of the gain flattening filter reduces overall power loss by combining the functionalities of at least two passive components of the optical repeater while providing circuit integration that reduces system and hardware related costs. Moreover, the optical repeater may include various HLLB features for system monitoring.

As described above, optical repeaters of prior solutions include separate and different types of passive components, such as an FBG-based GFF or a two port TF-GFF and a coupler which consume various levels of power. The one or more embodiments, examples, and/or aspects disclosed herein directed to a new and novel type of thin-film gain flattening filter, e.g., a 4-port TF-GFF, replaces at least the FBG-based GFF or the two port TF-GFF and the coupler components of previous solutions, which increases overall power efficiency of a repeater while providing system monitoring capabilities, thereby overcoming the problems inherent in the previous solutions.

The present invention will now be described more fully hereinafter with reference to the accompanying drawings, in which preferred embodiments of the invention are shown. This invention, however, may be embodied in many different forms and should not be construed as limited to the embodiments set forth herein. Rather, these embodiments are provided so that this disclosure will be thorough and complete, and will fully convey the scope of the invention to those skilled in the art. In the drawings, like numbers refer to like elements throughout.

Referring to the drawings, FIG. 1 illustrates a 4-Port thin-film gain flattening filter (TF-GFF) 100. As shown, the 4-port TF-GFF includes a dual fiber collimator 102, a dual fiber collimator 104, port 106, 108, 110, 112, and a filter plate 114. Ports 106, 108, 110, and 112 may be optical fibers terminated at their respective ends with fiber optic connectors, which may be referred to as "fiber optic pigtails." It may be understood that the filter plate 114 may be positioned slightly non-perpendicular relative to the direction of a collimated beam, for instance, so that reflected light from the filter plate 114 is not coupled back into the input fiber optic pigtail to ensure sufficiently high return loss.

According to an embodiment, light input from port 106 may be partially transmitted through the filter plate 114 and traced to port 112, while some of the light may be reflected from the filter plate 114 and traced to port 108 (where the traces are indicated by the single arrows). In a similar manner, light input from port 108 may be partially transmitted through the filter plate 114 and traced to port 110 while simultaneously being reflected from the filter plate 114 and traced to port 106 (where the traces are indicated by the double arrows).

In further embodiments, light input from the right side of the 4-port TF-GFF may trace and reflect similarly to light input from the left side of the 4-port TF-GFF, as described above. Thus, light input from ports 110 and 112 may be transmitted and traced to ports 108 and 106, respectively, and reflected from the filter plate 114 and traced to ports 112 and 110, respectively (where the traces are shown by the triple arrows for port 110 and the quadruple arrows for port 112).

Figure 2:
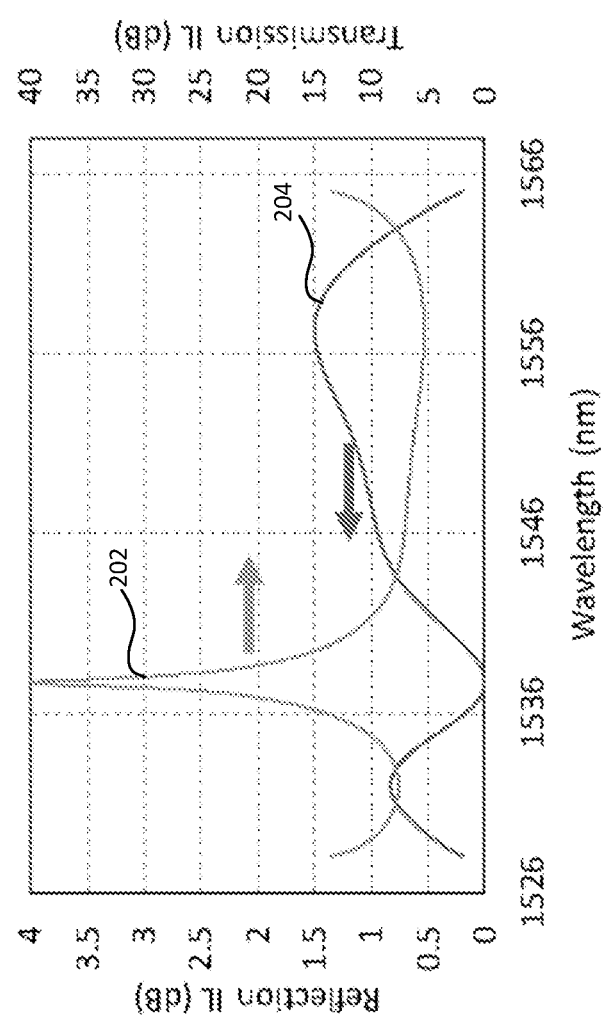
FIG. 2 illustrates an example graph of a reflection path insertion loss (IL) spectrum and a transmission path IL spectrum in accordance with one or more embodiments of the disclosure.

FIG. 2 illustrates an exemplary graph 200 of a reflection path insertion loss (IL) spectrum 202 and a transmission path IL spectrum 204 of a TF-GFF (e.g., a 4-port TF-GFF) according to embodiments. For example, the reflection path IL spectrum 202 corresponds to or matches a specific Erbium-doped fiber (EDF) GFF target spectrum, and the transmission IL spectrum is complementary to that EDF GFF target spectrum. A TF-GFF filter may be designed or configured to have IL spectrum of either the transmission path or the reflection path to match the target EDF gain flattening spectrum. This path, may be referred to as "GF path" And the corresponding reflection path or transmission path may be referred to as "complementary path." The selection of the filter design options, i.e. whether to use transmission path or reflection path as a GF path, may be based on which approach can give smaller GFF shape errors and/or lower loss as further described below.

Accordingly, the 4-port TF-GFF 100 incorporates the functionality of a conventional GFF through GF paths while providing additional signal feedback through complementary paths or pigtails for system monitoring purposes which would otherwise require a conventional coupler. As a result, this new and novel type of GFF may be used as a GFF-coupler hybrid component, which allows lower optical attenuation than the sum of those two individual components, so as to achieve higher power efficiency and space-cost reduction.

Figure 3A:
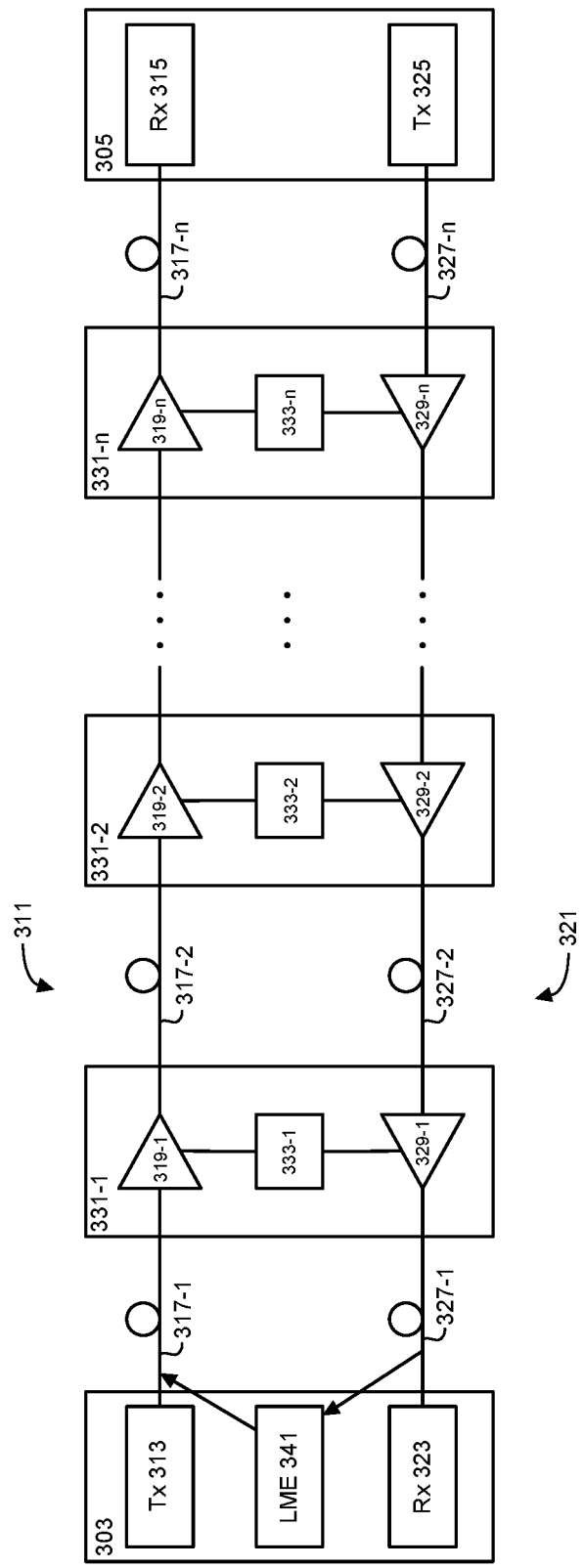
FIG. 3A illustrates a schematic of an optical communication system in accordance with one or more embodiments of the disclosure.

FIG. 3A illustrates an example bi-directional optical communication system 301. As shown, a monitoring system may be implemented in the bi-directional optical communication system 301. The optical communication system 301 may include terminals 303, 305 connected by two unidirectional optical paths 311, 321, which together form a bi-directional optical path pair. Optical path 311 may transmit information in one direction from a transmitter 313 in the terminal 303 to a receiver 315 in the terminal 305. Optical path 321 may transmit information in the other direction from a transmitter 325 in the terminal 305 to a receiver 323 in the terminal 303. With respect to terminal 303, the optical path 311 is an outbound path and the optical path 321 is an inbound path. The optical path 311 may include optical fibers 317-1 to 317-$n$ and optical amplifiers 319-1 to 319-$n$, and the optical path 321 may include optical fibers 327-1 to 327-$n$ and optical amplifiers 329-1 to 329-$n$.

The optical path pair (e.g., optical paths 311, 321) may be configured as a set of amplifier pairs 319-1 to 319-$n$ and 329-1 to 329-$n$ within repeaters 331-1 to 331-$n$ connected by pairs of optical fibers 317-1 to 317-$n$ and 327-1 to 327-$n$, which may be included in an optical fiber cable together with fibers supporting additional path pairs. Each repeater 331 may include a pair of amplifiers 319, 329 for each path pair and may include additional amplifiers for additional path pairs. The optical amplifiers 319, 329 may utilize EDFAs or other rare earth doped fiber amplifiers, Raman amplifiers or semiconductor optical amplifiers. A coupling path 333-1 to 333-$n$ may be coupled between optical paths 311, 321, for example, in one or more of the repeaters 331-1 to 331-$n$ and may include, for example, one or more passive optical coupling components, as will be described in greater detail below.

Monitoring equipment, LME 341, may be located in one or both of the terminals 303, 305 to provide passive line monitoring for the optical paths 311, 321 using, for example, OTDR, COTDR or HLLB. LME 341 may perform the signal generation, signal detection and processing functions and may include transmitters, receivers, and processors configured to perform those functions. LME 341 may launch a monitoring or test signal into optical path 311 (e.g., an outbound optical path). Coupling paths 333-1 to 333-$n$ may couple a sample of the monitoring or test signal propagating in optical path 311 into the forward propagating direction of optical path 321 (e.g., an inbound optical path). LME 341 may then receive and measure the samples.

Although the coupling paths 333-1 to 333-$n$ are shown as located with each pair of amplifiers 319-1 to 319-$n$ and 329-1 to 329-$n$, the coupling paths may be located in other locations (e.g., outside of amplifier pairs) and may not be located in every amplifier pair. According to an exemplary embodiment, the coupling paths 333-1 to 333-$n$ may be symmetric in operation, e.g., the function that describes the percent of optical power at each wavelength transferred from path 311 to path 321 by a coupling path 333-1 is the same as the function that describes the percent of optical power at each wavelength transferred from path 321 to path 311 by the coupling path 333-1. Alternatively, one or more coupling paths may not be symmetric and different coupling paths may have different transfer functions. Coupling paths 333-1 to 333-$n$ may also be different for OTDR/COTDR monitoring and HLLB monitoring. A coupling path for OTDR/COTDR generally couples only reflected light (e.g., reflected OTDR test signals) on the outbound path 311 into the inbound path 321, whereas a coupling path for HLLB couples monitoring signals transmitted on the outbound path 311 into the inbound path 321.

Although an exemplary embodiment of the optical communication system 301 is shown and described, variations of the optical communication system 301 are within the scope of the present disclosure. The optical communication system 301 may include, for example, more optical path pairs and more or fewer repeaters. Alternatively, the optical communication system 301 may not include any optical amplifiers or may include, instead of optical amplifiers, optical pump power sources suitable for implementing optical gain by Raman amplification within optical fibers connecting repeaters.

According to an exemplary method of monitoring optical communication system 301, one or more OTDR test or probe signals may be transmitted (e.g., by LME 341) on the outbound optical path 311. As used herein, OTDR may generally refer to both standard OTDR and coherent OTDR (COTDR). Moreover, multiple OTDR test signals may be transmitted (e.g., at different wavelengths) while loading the outbound optical path 311 and/or the inbound optical path 321 to provide differential monitoring. OTDR test signals transmitted on outbound path 311 may be reflected by one or more reflecting elements in outbound optical path 311 and the reflected OTDR test signals may be coupled onto inbound optical path 321 by one or more of the coupling paths 333-1 to 333-$n$.

It may be understood that the LME, or any other suitable system monitoring device, may be include at least one memory and one or more processors (e.g., CPU, ASIC, FGPA, any conventional processor, etc.) to execute instructions stored in memory. Moreover, the system monitoring feature may be at least partially implemented as a program of instructions on a non-transitory computer readable storage medium capable of being read by a machine (e.g., LME, system monitoring device, any suitable computing device, etc.) capable of executing the instructions. Thus, in examples, the LME may execute a program that allows the LME to generate and transmit LME channel or test signals, which can be routed back to the LME from the HLLB of the optical repeater 302 and analyzed for system monitoring purposes.

Figure 3B:
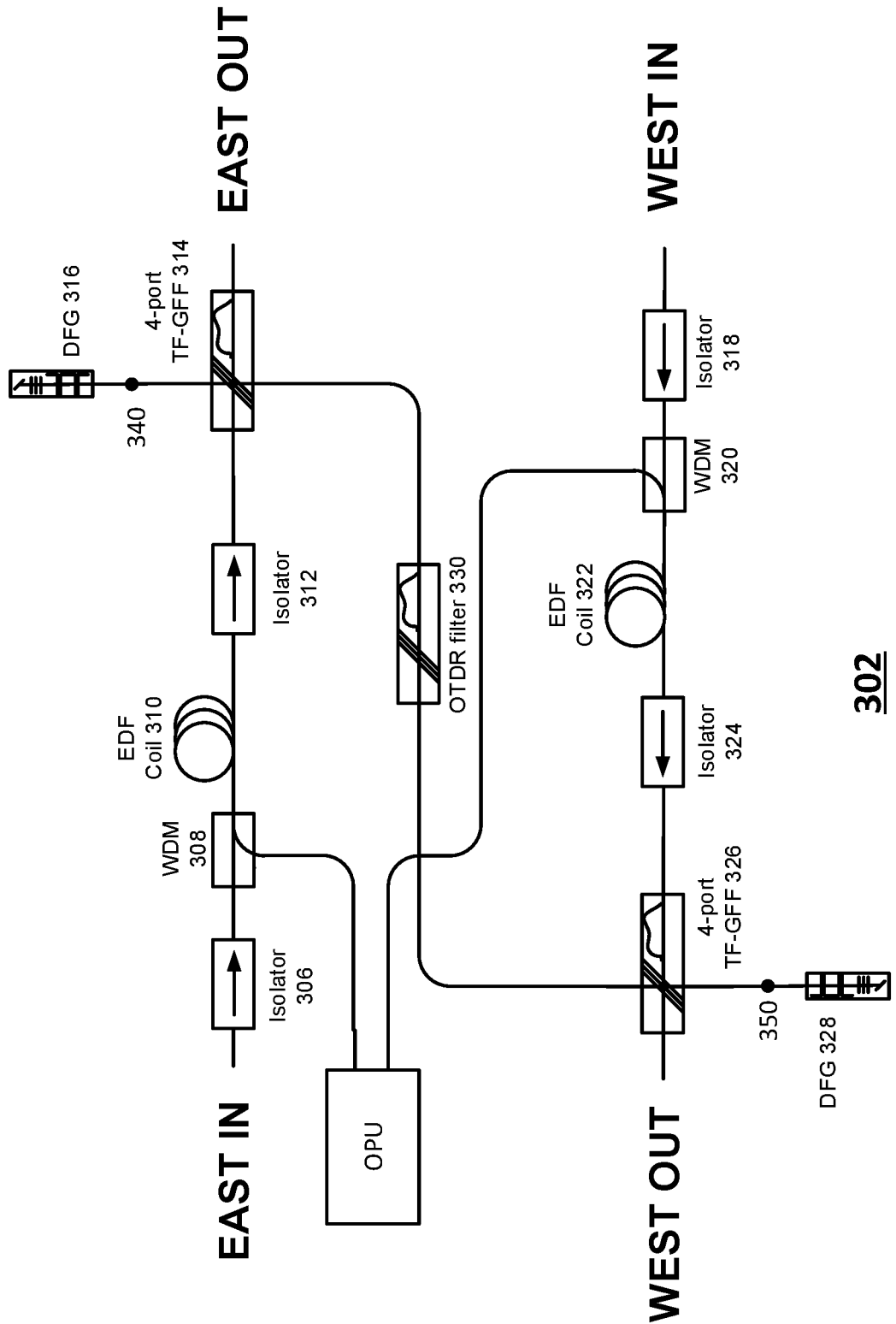
FIG. 3B illustrates a schematic of an example optical repeater in accordance with one or more embodiments of the disclosure.

FIG. 3B illustrates an exemplary optical repeater 331$n$ (renumbered as 302 for ease of reference) implemented in a bi-directional optical communication system 301. The optical repeater 302 may be configured or designed for a pair of optical fibers and incorporates two different 4-port TF-GFFs that use transmission path IL to target the gain flattening spectrum in order to realize, for example, EDFA and HLLB functionalities, such as gain tilt monitoring, optical time-domain reflectometer (OTDR) capabilities, etc. As shown, at one side (e.g., the "east" side), the repeater 302 may include at least an optical isolator 306, a wavelength-division multiplexer (WDM) 308, an EDF coil 310, an optical isolator 312, a 4-port TF-GFF 314, and a dual fiber grating (DFG) 316. The DFG may be used in a system with two LME channels for gain tilt monitoring and may be replaced by a single channel fiber grating if only one LME channel is used in the system. A second side of the optical repeater 302 (e.g., the "west" side) may be similarly arranged with similar components: at least an optical isolator 318, a WDM 320, an EDF coil 322, an optical isolator 324, a 4-port TF-GFF 326, and a DFG 328.

As will be further described below, an OTDR filter 330 may be arranged between the east side and the west side of the optical repeater 302, for example, disposed between the 4-port TF-GFFs 314 and 326. Moreover, an optical pump unit (OPU), which may include multiple pump lasers, may be coupled to the WDMs 308 and 320. Although not shown, line monitoring equipment (LME) or other suitable types of system monitoring devices may be connected to the optical repeater 302 for purposes of monitoring the system for component failure as described above with reference to FIG. 3A. The LME may be connected to nodes 340 and 350, as shown, where LME channels or test signals may be input, transmitted, and/or received, for instance, at these nodes.

The EDF coil 310 may output an amplified optical signal at a particular wavelength. During operation, the amplified signal output from the EDF coil 310 may be flattened via a transmission path of the 4-port TF-GFF 314, which may then be output to the "east out" port, and a residual amplified signal may be reflected by the 4-port TF-GFF 314. Additionally, LME channel signals from node 340 may be reflected by the DFG 316 and passed back through the 4-port TF-GFF 314. Both the reflected-residual amplified signal and the reflected LME channel signals may be passed through the OTDR filter 330, where the signals may be reflected by the 4-port TF-GFF 326 to the "west out" port. The OTDR filter 330 may be designed to have minimum attenuation at specific wavelengths, e.g., wavelength of the reflected-residual amplified signal, reflected LME channel wavelength, etc. To at least that end, the LME channel signals from the east side of the optical repeater 302 may be looped back into the west side, thereby achieving conventional HLLB functionality. In a similar manner, the LME channel signals from the west side may be looped back to the east side.

According to further examples, Rayleigh backscatter signals from the east out port by the optical fiber may be reflected by the 4-port TF-GFF 314 and passed through the OTDR filter 330, which may be reflected to the west out port by the 4-port TF-GFF 326. It may be understood that the received Rayleigh backscatter signals at the west out port provide OTDR functionality, for example, as conventional HLLB OTDR function. In instances, because the reflectivity associated with the 4-port TF-GFF 314 (or the 4-port TF-GFF 326) may not be high enough to limit the power of the backscatter signal, the OTDR filter 330 may be configured to completely or partially suppress the in-band backscatter signal power based on the requirement of in-band OTDR functionality.

It may be understood that the various components shown in the optical repeater 302 may be connected, arranged, coupled, attached (whichever definition applies) in any suitable manner to allow proper operation of the optical repeater and its functionalities.

Figure 4:
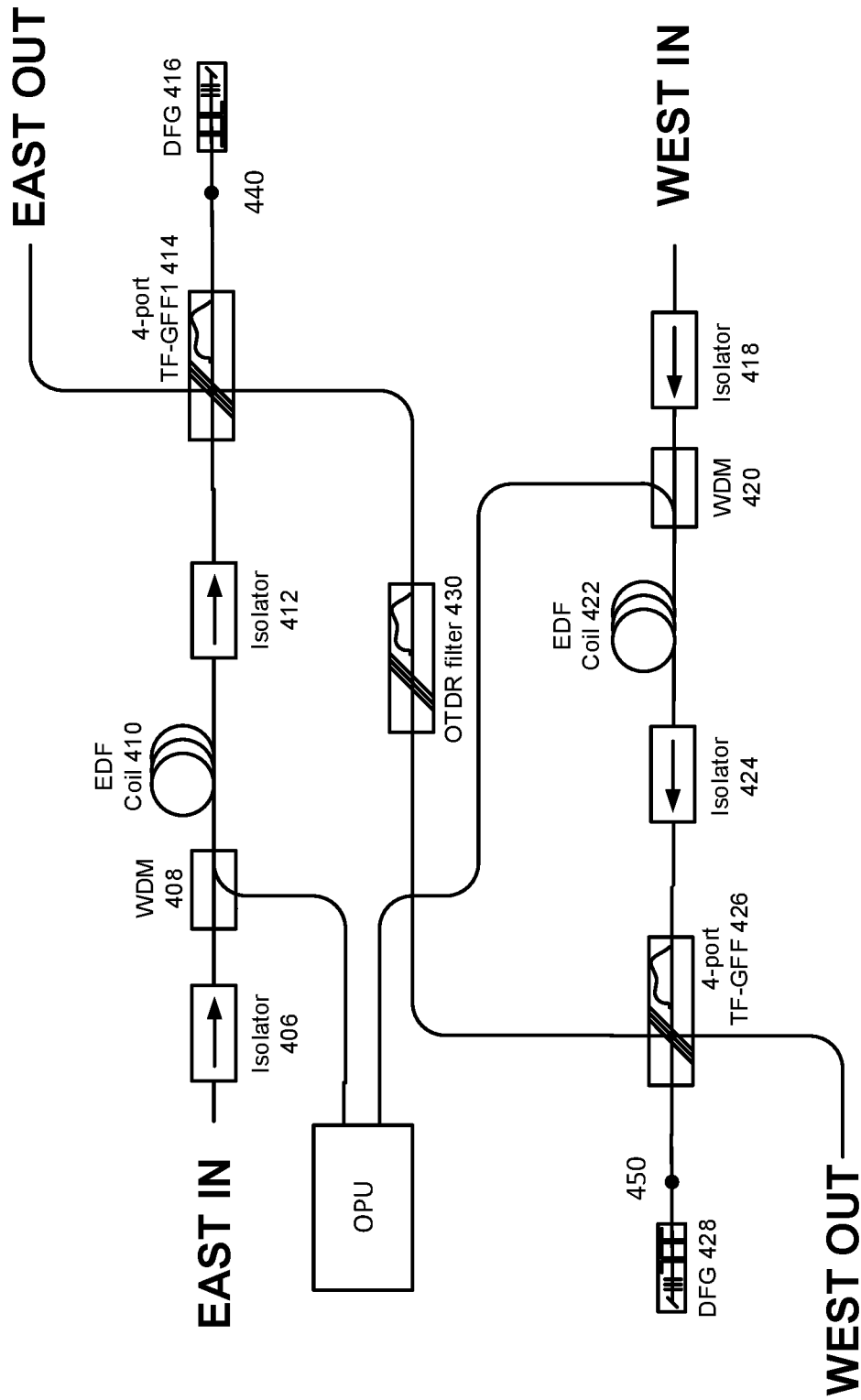
FIG. 4 illustrates a schematic of another example of an optical repeater in accordance with one or more embodiments of the disclosure.

FIG. 4 illustrates an optical repeater 400, which is an alternative embodiment of the optical repeater 302 illustrated in FIG. 3B. As shown, the optical repeater 400 includes an optical isolator 406, a WDM 408, an EDF coil 410, an optical isolator 412, a 4-port TF-GFF 414, a DFG 416, an optical isolator 418, a WDM 420, an EDF coil 422, an optical isolator 424, a 4-port TF-GFF 426, a DFG 428, an OTDR filter 430, the functionalities of which may be the same as the components of repeater 302 of FIG. 3B. The design and configuration, however, of the optical repeater 400 is different in that the 4-port TF-GFFs 414 and 426 use reflection path IL (as opposed to transmission path IL used in FIG. 3B) to target the gain flattening spectrum.

As shown, signals from the reflection path of the 4-port TF-GFF 414 may be output to the "east out" port of the optical repeater 400. The complementary transmission path, or the transmission port, of the 4-port TF-GFF 414 may be used for LME channel signal loop-back from node 440 in the optical repeater 400. Similarly, signals from the reflection path of the 4-port TF-GFF 426 may be output to the "west out" port, and the complementary transmission path, or the transmission port, may be used for LME channel signal loop-back from node 450.

Figure 5:
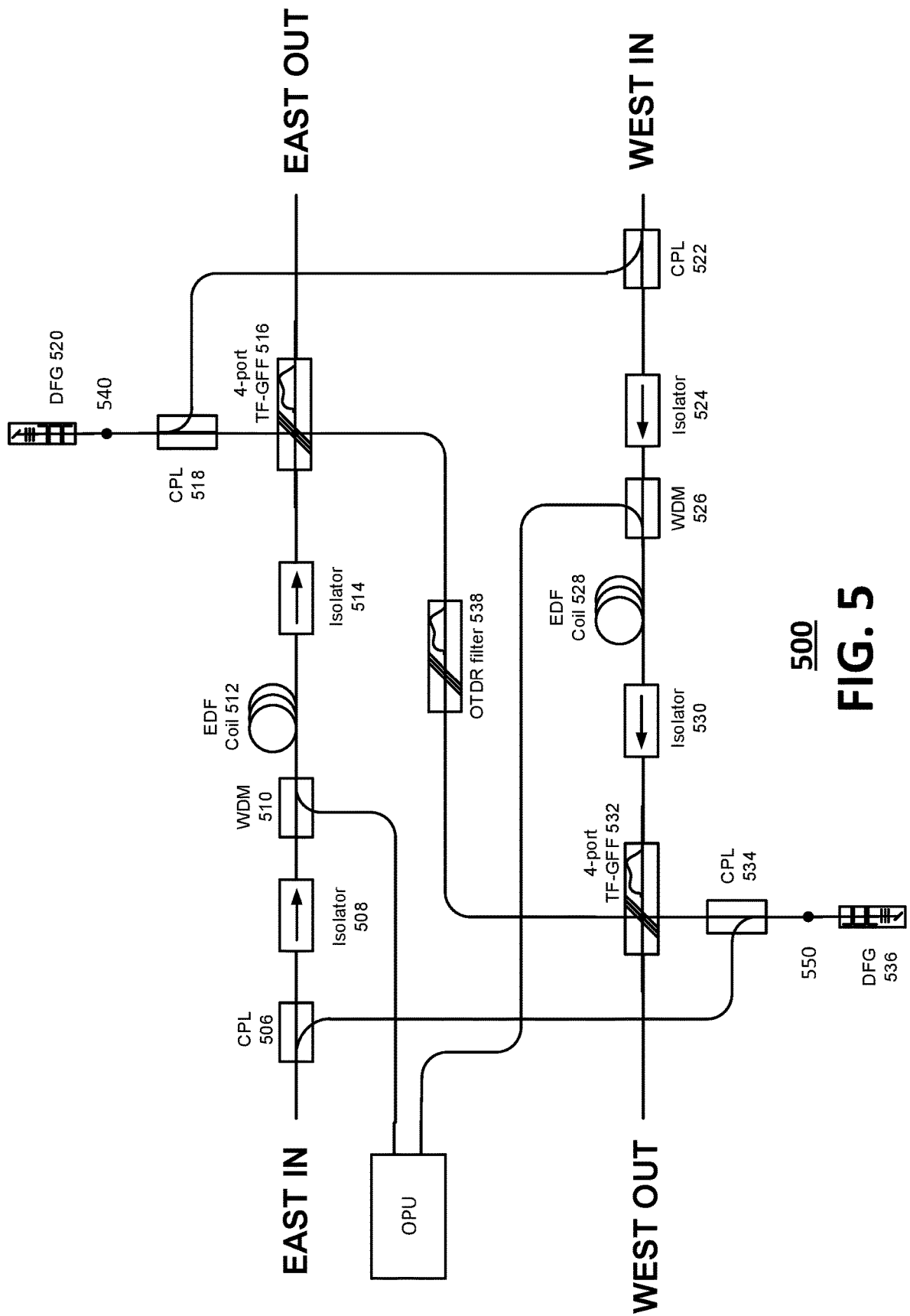
FIG. 5 illustrates a schematic of an example long-reach high-loss loop-back (HLLB) optical repeater in accordance with one or more embodiments of the disclosure.

FIG. 5 illustrates a long-reach HLLB optical repeater 500 according to one embodiment. The long-reach HLLB optical repeater 500 may include at least an optical coupler (CPL) 506, an optical isolator 508, a WDM 510, an EDF coil 512, an optical isolator 514, a 4-port TF-GFF 516, a CPL 518, and a DFG 520 arranged on the east side of the repeater 500, and further, may include at least a CPL 522, an optical isolator 524, a WDM 526, an EDF coil 528, an optical isolator 530, a 4-port TF-GFF 532, a CPL 534, and a DFG 536 arranged on the west side. The long-reach HLLB optical repeater 500 may also include an OTDR filter 538 that is arranged between the connection of the 4-port TF-GFFs 516 and 532, as shown. The long-reach HLLB optical repeater 500 may be configured such that the LME channel signals from node 540 at the east side are routed to both the west side input (via a separate fiber, cable, path, etc., as shown) and the west side output (via the path from the 4-port TF-GFF 516, through the OTDR filter 538, and to the 4-port TF-GFF 532). An identical or similar configuration may be set up from the west side to the east side, as illustrated.

Similar to the optical repeater 302 of FIG. 3B, the amplified signals output from the EDF coils 512 and 528 may be flattened via the transmission paths of the 4-port TF-GFFs 516 and 532, respectively. Advantageously, long-reach HLLB optical repeaters, such as the one depicted in FIG. 5, may be used or implemented in optical communication systems having longer span lengths in order to have the test signal, e.g., LME channel signal, OTDR signal, etc. cover the full span.

Figure 6:
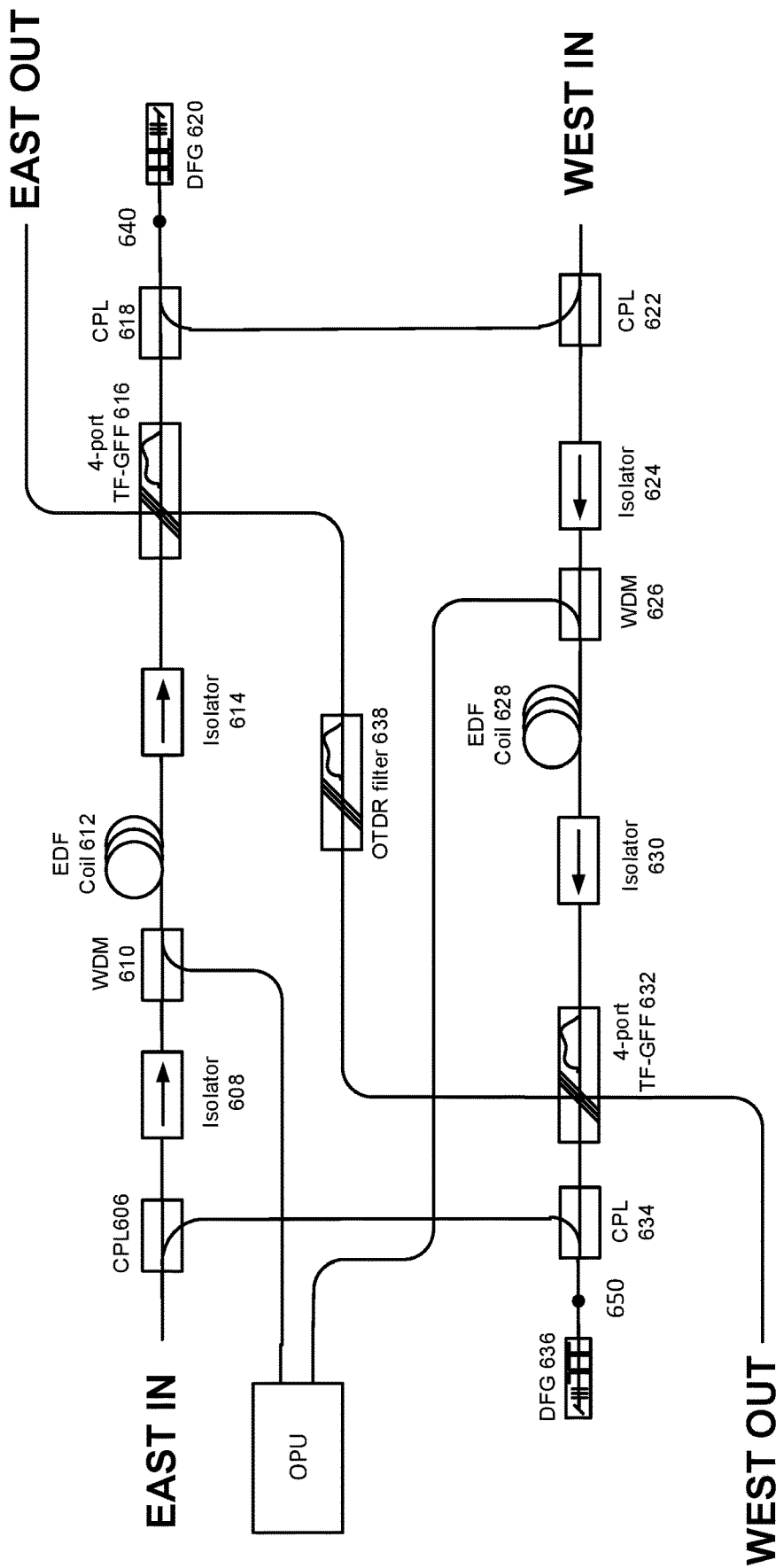
FIG. 6 illustrates a schematic of another example of a long-reach HLLB optical repeater in accordance with one or more embodiments of the disclosure.

FIG. 6 illustrates a long-reach HLLB optical repeater 600, which is an alternative embodiment of the long-reach HLLB optical repeater 500 of FIG. 5. As depicted, the long-reach HLLB optical repeater 600 may include at least a CPL 606, an optical isolator 608, a WDM 610, an EDF coil 612, an optical isolator 614, a 4-port TF-GFF 616, a CPL 618, a DFG 620, a CPL 622, an optical isolator 624, a WDM 626, an EDF coil 628, an optical isolator 630, a 4-port TF-GFF 632, a CPL 634, a DFG 636, and an OTDR filter 638.

While the components and the functionalities of the long-reach HLLB optical repeater 600 is the same as the optical repeater 500 of FIG. 5, the long-reach HLLB optical repeater 600 is differently configured in that the 4-port TF-GFFs 616 and 632 of the optical repeater 600 use reflection path IL (as opposed to transmission path IL) to target the gain flattening spectrum. Thus, the transmission port of the 4-port TF-GFF 616 may be used for LME channel signal loop-back from node 640 in the optical repeater 400. And the same at node 650 for the 4-port TF-GFF 632.

Figure 7:
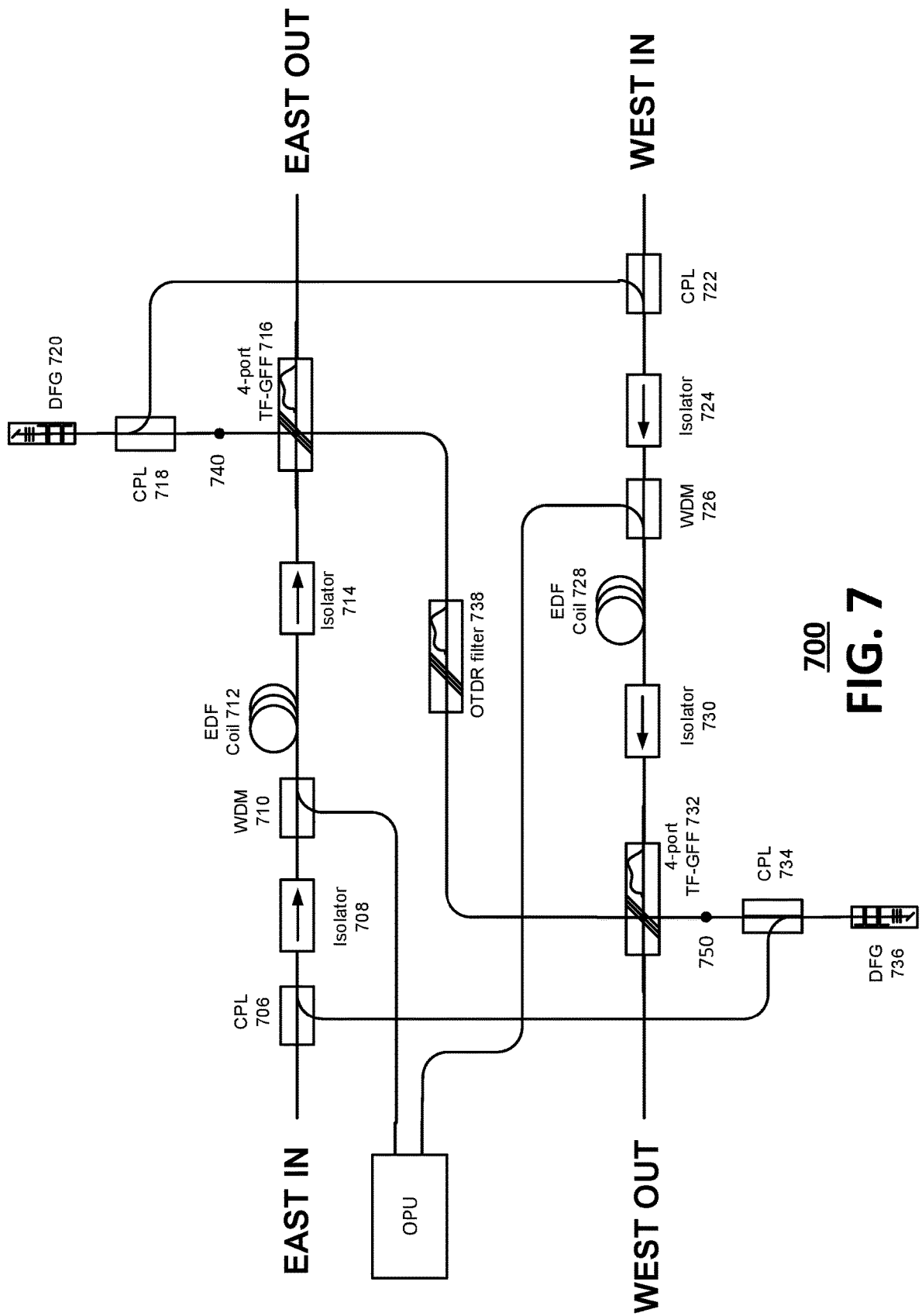
FIG. 7 illustrates a schematic of an example double-pass HLLB optical repeater in accordance with one or more embodiments of the disclosure.

FIG. 7 illustrates a double-pass HLLB optical repeater 700 according to one embodiment. For example, the double-pass HLLB optical repeater 700 includes, at the east side, a CPL 706, an optical isolator 708, a WDM 710, an EDF coil 712, an optical isolator 714, a 4-port TF-GFF 716, a CPL 718, and a DFG 720. At the west side, the repeater 700 includes a CPL 722, an optical isolator 724, a WDM 726, an EDF coil 728, an isolator 730, a 4-port TF-GFF 732, a CPL 734, and a DFG 736. Moreover, a OTDR filter 738 is arranged between the east and west sides, e.g., between the connections of the 4-port TF-GFFs 716 and 732.

As shown, LME channel signals from node 740 at the east side is routed back to the input of the repeater on the west side, e.g., at the "west in" port side. Similarly, the LME channel signals from node 750 at the west side is routed back to the input on the east side, e.g., at the "east in" port side. Like the above transmission-IL-based examples, the amplified signals output from the EDF coils 712 and 728 may be flattened via the transmission paths of the 4-port TF-GFFs 716 and 732, respectively. Thus, the reflection ports of the 4-port TF-GFFs 716 and 732 may be used for the LME channel signal loop-back and OTDR functions.

By way of example, the double-pass HLLB optical repeater 700 may be used or implemented in optical communication systems to enhance the signature of pump failure in the OPU that may be detected by the LME or other suitable system monitoring devices, as the monitoring signals can be double amplified while passing through both EDF coils 712 and 728, which share the same OPU and are both sensitive to the failure therein.

Figure 8:
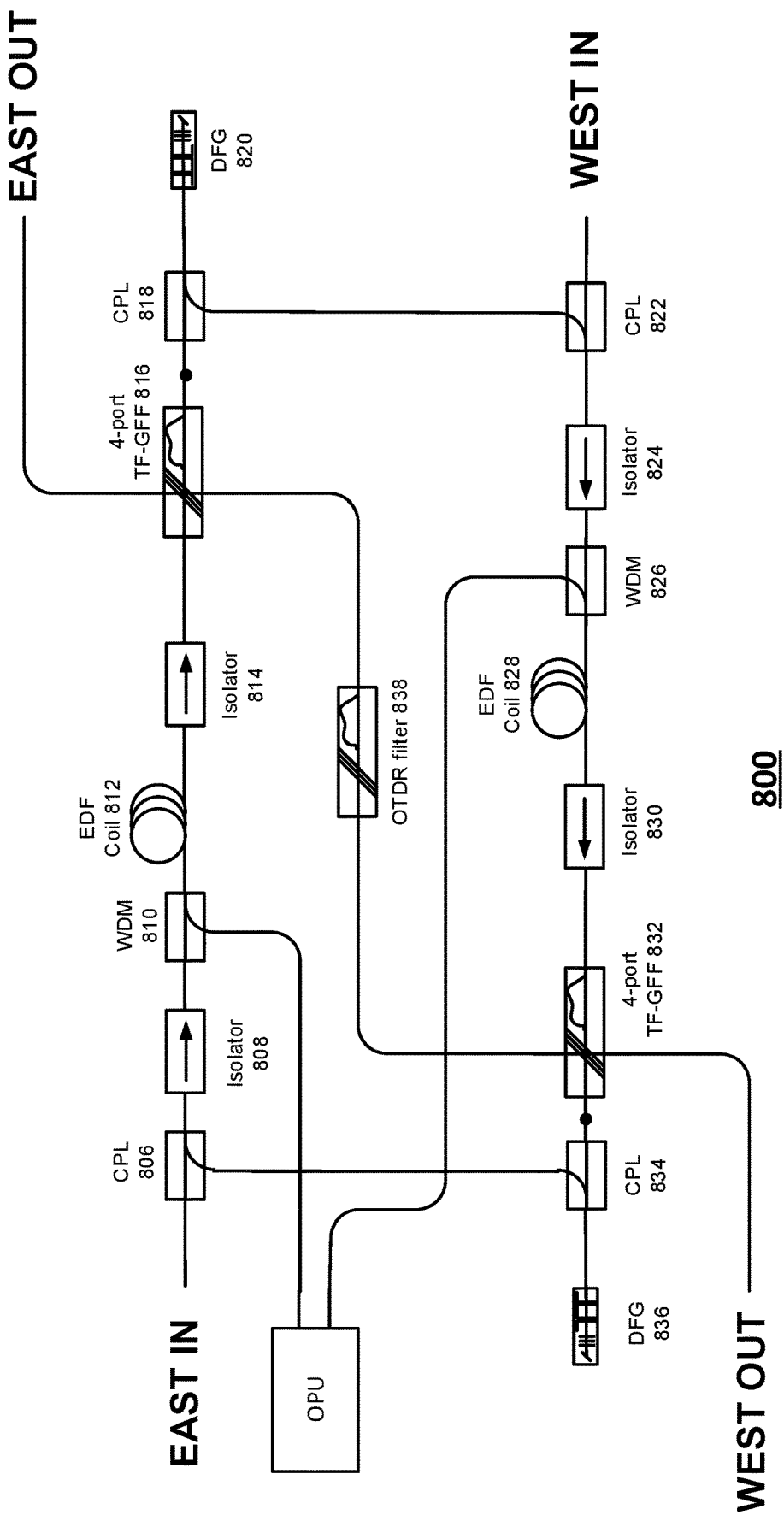
FIG. 8 illustrates a schematic of another example of a double-pass HLLB optical repeater in accordance with one or more embodiments of the disclosure.

FIG. 8 illustrates a double-pass HLLB optical repeater 800, which is an alternative embodiment of the double-pass HLLB optical repeater shown in FIG. 7. The components of the double-pass HLLB optical repeater 800 (CPL 806, optical isolator 808, WDM 810, EDF coil 812, optical isolator 814, 4-port TF-GFF 816, CPL 818, DFG 820, CPL 822, optical isolator 824, WDM 826, EDF coil 828, isolator 830, 4-port TF-GFF 832, CPL 834, DFG 836, and OTDR filter 838) and the functionalities thereof may be the same as the repeater of FIG. 7, except that the 4-port TF-GFFs are configured differently in that the 4-port TF-GFFs 816 and 832 of the optical repeater 800 use reflection path IL to target the gain flattening spectrum, and thus, the transmission ports of the TF-GFFs may be used for the LME channel signal loop-back.

Herein, novel and inventive apparatus and techniques for efficient optical signal amplification with greater power efficiency and with system monitoring features are disclosed. The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings.

Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A filter comprising:
a first dual-fiber collimator, wherein the first dual-fiber collimator has a first port and a second port;
a second dual-fiber collimator, wherein the second dual-fiber collimator has a third port and a fourth port; and
a filter plate arranged between the first dual-fiber collimator and the second dual-fiber collimator, wherein the first port, the second port, the third port, and the fourth port are configured to receive and/or transmit light and the filter plate is positioned slightly non-perpendicular relative to the direction of the transmitted light.

2. The filter of claim 1, wherein:
the light input at the first port is partially transmitted through the filter plate and traced to the fourth port, and the light input at the first port is reflected from the filter plate and traced to the second port.

3. The filter of claim 1, wherein:
the light input at the second port is partially transmitted through the filter plate and traced to the third port, and the light input at the second port is reflected from the filter plate and traced to the first port.

4. The filter of claim 1, wherein:
the light input at the third port is partially transmitted through the filter plate and traced to the second port, and the light input at the third port is reflected from the filter plate and traced to the fourth port.

5. The filter of claim 1, wherein:
the light that is input at the fourth port is partially transmitted through the filter plate and traced to the first port, and the light that is input at the fourth port is reflected from the filter plate and traced to the third port.

6. The filter of claim 1, wherein each of the ports is:
an optical fiber terminated at its respective end with a fiber optic connector.

7. The filter of claim 1, wherein the filter plate is a thin film filter.

8. The filter of claim 7, wherein the filter plate is further operable to reflect light away from a respective port of the first, second, third or fourth port that the light was input.

9. The filter of claim 1, wherein the filter plate is further operable to provide a high return loss based on a position of the filter plate.

10. The filter of claim 1, wherein the article is a 4-port thin-film gain flattening filter.

11. An article, comprising:
a first dual-fiber collimator having a pair of first dual-fiber collimator ports;
a second dual-fiber collimator having a pair of second dual-fiber collimator ports; and
a filter plate arranged between the first dual-fiber collimator and the second dual-fiber collimator,
wherein light input to one port of the pair of the first dual-fiber collimator ports is partially reflected out another port of the pair of the first dual-fiber collimator ports and transmitted to one port of the pair of the second dual-fiber collimators; and
wherein the filter plate is positioned slightly non-perpendicular relative to the direction of the light.

12. The article of claim 11, wherein:
the pair of first dual-fiber collimator ports are a first port and a second port of the article, and
the pair of second dual-fiber collimator ports are a third port and a fourth port of the article.

13. The article of claim 12, wherein the article is operable to:
partially reflect light input into the first port to the second port where the reflected light is output and partially transmit light to the fourth port where the transmitted light is output.

14. The article of claim 12, wherein the article is operable to:
partially reflect light input into the second port to the first port where the reflected light is output and partially transmit light to the third port where the transmitted light is output.

15. The article of claim 12, wherein the article is operable to:
partially reflect light input into the third port to the fourth port where the reflected light is output and partially transmit light to the second port where the transmitted light is output.

16. The article of claim 12, wherein the article is operable to:
partially reflect light input into the fourth port to the third port where the reflected light is output and partially transmit light to the first port where the transmitted light is output.

17. The article of claim 11, wherein each of the ports is an optical fiber terminated at its respective end with a fiber optic connector.

18. The article of claim 11, wherein the filter plate is a thin film filter.

19. The article of claim 11, wherein the filter plate is further operable to reflect light away from a respective port of the first, second, third or fourth port that the light was input.

20. The article of claim 11, wherein the filter plate is further operable to provide a high return loss based on a position of the filter plate.

* * * * *